3,023,226
PROCESS FOR THE PREPARATION OF ACRYLO- NITRILE FROM PROPYLENE AND NITRIC OXIDE

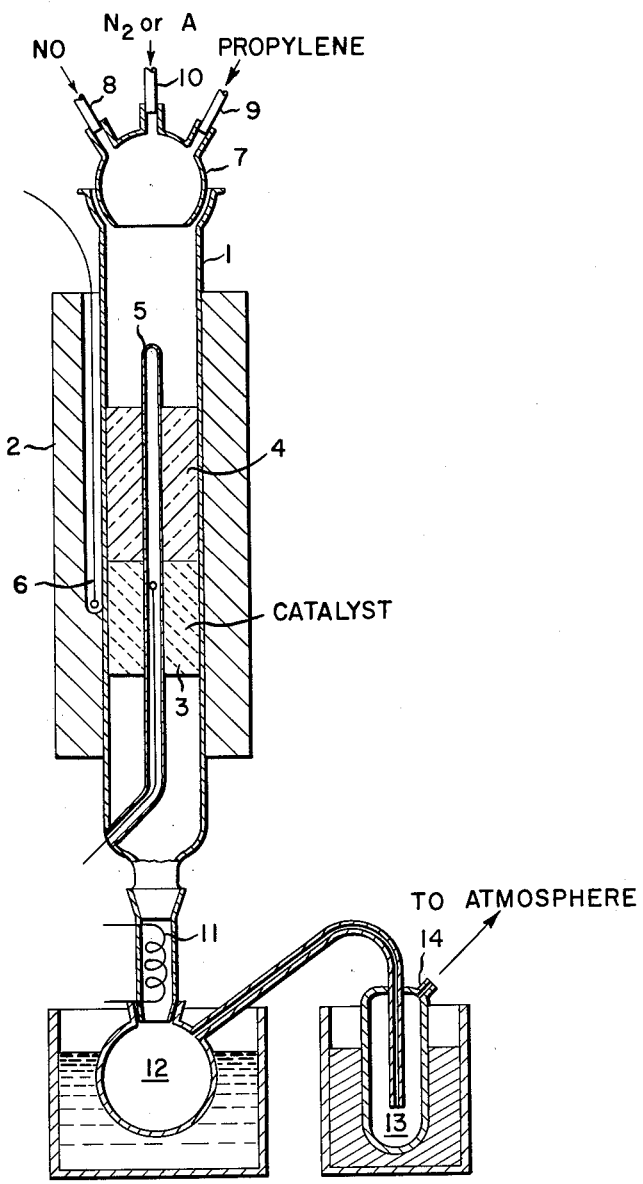

David C. England, Wilmington, and Robert E. Foster, Hockessin, Del., assignors to E. I. du Pont de Nemours and Company, Wilmington, Del., a corporation of Delaware
Filed Nov. 3, 1958, Ser. No. 771,353
4 Claims. (Cl. 260—465.3)

The present invention relates to a novel process for the preparation of acrylonitrile and to a new catalyst for use in this process. More particularly, the present invention relates to an improved method for the preparation of acrylonitrile from propylene and nitric oxide in the presence of a silver catalyst promoted with an alkaline earth metal oxide and extended on a heat-stable support containing less than 50 parts per million of iron.

The basic reaction by which acrylonitrile and other nitriles may be prepared from certain olefins and nitric oxide at elevated temperatures and in the presence of a dehydrogenation catalyst is disclosed in U.S. Patent 2,736,-739, issued February 28, 1956, to England et al. The present invention represents an improvement of the basic process disclosed by England et al. insofar as it relates to the catalytic preparation of acrylonitrile from propylene and nitric oxide.

It is an object of the present invention to provide an improved process for the catalytic synthesis of acrylonitrile from propylene and nitric oxide. It is a further object of the present invention to provide a new and improved catalyst for use in the aforementioned synthesis. It is a still further object of the present invention to provide a process for the preparation of acrylonitrile from propylene and nitric oxide by a convenient and economical technique. Other and additional objects will become apparent from a consideration of the ensuing specification and claims.

The foregoing objects are achieved by reacting propylene with nitric oxide in the presence of a silver catalyst promoted with an alkaline earth metal oxide and extended on a silica gel support having considerably less iron content than is normally present in silicas of this nature, i.e., less than 50 p.p.m. of iron.

Reference is made to the accompanying drawing which illustrates a convenient form of apparatus for carrying out the process of this invention. It is, of course, to be understood that other and different equipment is equally suitable, and practice of the invention on an industrial scale will require equipment of a somewhat different nature.

In the drawing, 1 represents a catalyst tube mounted vertically in an electric furnace 2. The catalyst 3 is supported near the base of the tube. Atop the catalyst within the tube there is provided a layer of quartz granules 4 which serve to provide a gas mixing and pre-heating space for the reactants. The catalyst tube is provided with a thermocouple well 5 which permits temperature measurements in the catalyst bed. The temperature of the furnace is suitably regulated by means of electronically activated power supply relays which are controlled by a thermocouple 6 within the furnace. The top of the catalyst tube is fitted with an adaptor 7 having gas inlet tubes 8, 9, and 10 for the admission of nitric oxide, propylene, and an inert gas, such as nitrogen or argon. After passing through the catalyst bed 3, the gases are directed through a water-cooled condenser 11. The condensed liquids are collected in a receiver 12 and the vapors are passed through a trap 13 cooled with a solid carbon dioxide-acetone mixture before venting to the atmosphere at 14.

The operation of the equipment illustrated in the drawing is as follows: In starting a run with the apparatus illustrated, the catalyst is generally first heated with nitrogen or argon at a temperature of about 400° C. for from 1–4 hours to convert the silver in the catalyst to the activated metallic state. The activation can, of course, be done separately before the equipment is assembled, but activating in situ represents the simplest and most convenient technique. Following this conditioning step, where used, metered streams of propylene and nitric oxide are admitted at the desired rate, with or without the addition of an inert gaseous diluent. At the end of the run, the solid carbon dioxide-acetone trap is allowed to warm to room temperature and the liquid is combined with the condensate from the receiver. The liquid product normally consists of two layers, which are separated by conventional means. The crude acrylonitrile (upper layer) is then distilled at atmospheric pressure to obtain the product in relatively pure form for subsequent commercial use, for example, for polymerization. The invention is further illustrated by the following examples.

Example 1

A catalyst was prepared by saturating 500 volumes of 8–14 mesh commercial silica gel with water and then with 750 volumes of acetone to remove organic-soluble contaminants. The gel was then successively treated with 3000 volumes (in 3 equal proportions) of demineralized water, 1500 volumes (2 equal proportions) of 30% acetic acid, and 9000 volumes (in 12 equal proportions) of 3-N-nitric acid. Thereafter the gel was treated with water until the washings were neutral. Colorimetric analysis of the nitric acid washings indicated that iron was being removed from the silica gel. Analysis of the treated silica indicated that after treatment the silica contained 15 p.p.m. of iron. It had a surface area of 533 m.$^2$/g., a pore diameter of 15 A., and a pore volume of 0.20 cc./g. Ten grams of silver nitrate and 2.5 grams of calcium nitrate dihydrate in 400 ml. of water were added to 150 grams of the treated silica. The mixture was allowed to stand for 1 hour at ambient temperature. Fifteen grams of 28% ammonium hydroxide and 200 grams of 0.8 N sodium hydroxide were added and the mixture was allowed to stand for 2 hours with occasional stirring. The liquid, which contained a small amount of flocculent precipitate was decanted, the impregnated gel was washed with 300 grams of water, and dried. The product analyzed 2.94% silver and 0.22% calcium.

Example 2

An apparatus of the type illustrated in the attached drawing was charged with 107.7 grams of the calcium oxide promoted silver-on-silica catalyst of Example 1. The catalyst was activated by heating at 400°–420° C. for 3 hours under a stream of argon and for an additional 2 hours under an argon-nitric oxide mixture containing 4.5% NO. The catalyst was then heated to 418°–456° C. and a reactant gas feed mixture containing 4% NO, 12% propylene, and 84% argon was passed through the catalyst bed at a space velocity of 700 hr.$^{-1}$ An acrylonitrile product was produced in 10% conversion and 90% yield, based on the nitric oxide charged. Only a slight trace of carbon dioxide was formed.

Example 3

The procedure of Example 2 is repeated with a comparable barium oxide promoted silver-on-silica catalyst and similar results are obtained.

Example 4

Following the procedure used in Example 1, a calcium oxide promoted silver-on-silica catalyst was prepared which contained 22 p.p.m. of iron, 2.81% silver, and 0.12% calcium. Equipment of the type disclosed in the drawing was charged with 110 ml. of this catalyst and activated in the manner disclosed in Example 2. The catalyst was heated to 402°–467° C. and a reactant gas feed mixture was then passed through the catalyst. The mixture consisted of argon flowing at the rate of 20 ml./sec., nitric oxide 1.4 ml./sec., and propylene 3 ml./sec., corresponding to a space velocity of 780 hr.$^{-1}$ Acrylonitrile was produced in 75% yield based on the nitric oxide.

*Example 5*

The procedure of Example 4 is repeated with a comparable magnesium oxide promoted silver-on-silica catalyst and similar results are obtained.

The percentage conversions stated in the foregoing examples are based on the amount of acrylonitrile isolated, as compared to the theoretical yield calculated from the nitric oxide processed. The amount of nitric oxide consumed is taken as the amount charged less the amount passing unchanged through the catalyst zone. Percentage yield is based on the amount of acrylonitrile recovered as compared to the amount of acrylonitrile theoretically obtainable from the amount of nitric oxide consumed.

A critical feature of the catalyst employed in the present invention is that the support must be essentially iron free, i.e., contain less than 50 p.p.m. of iron and preferably less than 25 p.p.m. Applicants have discovered that the presence of iron in an amount greater than 50 p.p.m. greatly enhances oxidative and degradative side reactions. Commercial silica and silica-alumina gels invariably contain substantial amounts of iron compounds as contaminants. They usually contain more than 100 p.p.m. of iron and often as much as 0.05% of iron, or more. Similarly, hydrous silicas prepared in the laboratory are characterized by the presence of iron introduced adventitiously. It is essential to the process of the present invention that the iron content of the catalyst support be reduced below the critical levels outlined above. This is accomplished by leaching the iron from the hydrous silica with a mineral acid, such as nitric or hydrochloric acid, or with acetic acid. The leaching treatment does not significantly alter the characteristics of the gel, and can be used to reduce the iron content to exceedingly low levels, e.g., as low as 1 p.p.m. or less.

The preferred alkaline earth metal promoter for the silver catalyst of the present invention is calcium oxide because of its economic advantages and its effectiveness. However, other alkaline earth metal oxides are operable, including, for example, the oxides of barium, strontium, beryllium, and magnesium.

The catalyst will contain up to 15% silver and alkaline earth metal oxide. For optimum performance the concentration of silver generally ranges between 0.1 and 10% and the concentration of alkaline earth metal oxide between 0.1 and 5% by weight of the support. The alkaline earth oxide can be incorporated in the catalyst by including the corresponding alkaline earth metal nitrate in the silver impregnating solution, followed by alkalization and co-deposition of silver and alkaline earth metal hydroxide on the support. Thermal activation of the catalyst will thereafter convert the silver salt and the alkaline earth metal hydroxide to the silver metal and the alkaline earth metal oxide. Alternatively, the alkaline earth metal oxide may be deposited on the support as the hydroxide prior to silver impregnation, or silver impregnation may be followed by deposition of the alkaline earth metal hydroxide or oxide, as desired.

The function of the alkaline earth metal oxide modifier lies in its ability to render the silver catalyst selective for promoting the formation of acrylonitrile rather than oxidation to carbon dioxide.

In the feed stream the mole ratio of nitric oxide to propylene may vary from 1:20 to 3:2. Best results are obtained with an NO/propylene mole ratio in the neighborhood of about 1:2 to 1:1, and this represents the preferred embodiment of the invention.

To dissipate the heat of reaction and to control the contact time of the reactants with the catalyst, an inert diluent such as nitrogen, argon, steam, or the like may be used. The latter will also serve as a gaseous carrier for the acrylonitrile product formed during the reaction. Where a gaseous diluent is used, the nitric oxide in the feed gas stream generally ranges from 2–33% by weight and preferably 5–20%.

The reaction is run at a temperature of 400°–700° C. Best yields of acrylonitrile are obtained at temperatures in the range of 425°–525° C., and this represents the preferred operating temperature range.

Space velocity, in general, is not critical to the invention and may be varied widely without departing from the scope of the process. Space velocities as low as 20 hr.$^{-1}$ and as high as 5000 hr.$^{-1}$ can be used. Space velocities in the range of 300–1000 hr.$^{-1}$ have given especially good results and the reaction is usually conducted employing space velocities within this range.

The reaction may be performed at atmospheric pressure which is economically attractive from the standpoint of equipment requirements. If desired, higher pressures may be used to increase the yield of the gaseous reactants without increasing the size of the reactors. Pressures lower than atmospheric are also operable.

The catalytic vapor phase reaction of propylene and nitric oxide according to the present invention provides a convenient, efficient, one-step route to acrylonitrile, a valuable industrial chemical. The invention has been described in detail in the foregoing specification. It will be readily apparent to those skilled in the art that many variations in the equipment, techniques, and compositions described may be made without departing from the spirit of the invention. It is intended, therefore, to be limited only by the following claims.

We claim:

1. A process for the preparation of acrylonitrile which comprises reacting nitric oxide with propylene at a temperature in the range of 400°–700° C. in the presence of an alkaline earth metal oxide-promoted silver catalyst extended on a silica gel support containing less than 50 p.p.m. of iron.

2. A process as in claim 1 wherein the support has less than 25 p.p.m. of iron.

3. A process for the preparation of acrylonitrile which comprises reacting nitric oxide with propylene at a temperature in the range of 400°–700° C. in the presence of a calcium oxide-promoted silver catalyst extended on a silica gel support containing less than 50 p.p.m. of iron.

4. A process as in claim 3 wherein the support has less than 25 p.p.m. of iron.

References Cited in the file of this patent

UNITED STATES PATENTS

| | | |
|---|---|---|
| 2,194,602 | Law et al. | Mar. 26, 1940 |
| 2,419,186 | Harris et al. | Apr. 15, 1947 |
| 2,476,771 | Salzberg | July 19, 1949 |
| 2,650,203 | Hawes et al. | Aug. 25, 1953 |
| 2,698,305 | Plank et al. | Dec. 28, 1954 |
| 2,736,739 | England et al. | Feb. 28, 1956 |